(12) United States Patent
Menzel et al.

(10) Patent No.: US 10,953,533 B2
(45) Date of Patent: Mar. 23, 2021

(54) MANUALLY GUIDED IMPLEMENT

(71) Applicant: Andreas Stihl AG & Co. KG, Waiblingen (DE)

(72) Inventors: Johannes Menzel, Wernau/Neckar (DE); Tobias Wörner, Korb (DE); Simone Pelludat, Schorndorf (DE); Samir Siam, Stuttgart (DE); Marc Schmid, Oppenweiler (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 123 days.

(21) Appl. No.: 16/269,259

(22) Filed: Feb. 6, 2019

(65) Prior Publication Data
US 2019/0240827 A1 Aug. 8, 2019

(30) Foreign Application Priority Data
Feb. 7, 2018 (DE) ...................... 10 2018 000 975.1

(51) Int. Cl.
| | |
|---|---|
| B25F 5/00 | (2006.01) |
| A01G 3/053 | (2006.01) |
| A01G 3/04 | (2006.01) |
| A01G 3/08 | (2006.01) |
| A01D 34/90 | (2006.01) |

(52) U.S. Cl.
CPC .............. *B25F 5/006* (2013.01); *A01G 3/053* (2013.01); *A01D 34/905* (2013.01); *A01G 3/085* (2013.01); *A01G 2003/0461* (2013.01)

(58) Field of Classification Search
CPC ........... B23B 7/00; B23B 15/00; A01G 3/062; B25F 3/00; B25F 5/02; F16B 7/1418
See application file for complete search history.

(56) References Cited

U.S. PATENT DOCUMENTS

| | | | | |
|---|---|---|---|---|
| 4,236,310 A | * | 12/1980 | Muller | ................. A01D 34/905 |
| | | | | 30/276 |
| 4,491,184 A | | 1/1985 | Kawaharazuka | |
| 4,714,447 A | * | 12/1987 | Hironaka | ............... A01D 34/30 |
| | | | | 30/276 |

(Continued)

FOREIGN PATENT DOCUMENTS

| | | |
|---|---|---|
| DE | 10034437 A1 | 1/2002 |
| EP | 2324963 A1 | 5/2011 |

(Continued)

*Primary Examiner* — Nathaniel C Chukwurah
(74) *Attorney, Agent, or Firm* — Lucas & Mercanti, LLP; Klaus P. Stoffel

(57) ABSTRACT

A manually guided implement possesses a guide tube, wherein a first mass body is disposed on a first end of the guide tube, and a second mass body is disposed on a second end of the guide tube. One of the mass bodies has a housing, and the other of the mass bodies has a tool driven by a drive motor. A power transmission mechanism for driving the tool between the first and second ends of the guide tube is guided in the interior of the guide tube. A first antivibration element is disposed between the first end of the guide tube and the first mass body. The guide tube in the direction of the longitudinal central axis thereof includes a first rigid subportion and a second rigid sub-portion that are connected to one another at an abutment location by at least one second antivibration element.

17 Claims, 6 Drawing Sheets

(56) References Cited

U.S. PATENT DOCUMENTS

| | | | |
|---|---|---|---|
| 5,692,306 A | 12/1997 | Stoll | |
| 5,926,960 A * | 7/1999 | Heywood | A01G 3/053 |
| | | | 30/216 |
| 7,070,009 B2 * | 7/2006 | Kawamoto | B25F 5/006 |
| | | | 173/162.1 |
| 9,333,636 B2 * | 5/2016 | Yamada | F16C 1/00 |
| 2002/0004988 A1 | 1/2002 | Stoll et al. | |
| 2008/0289842 A1 | 11/2008 | Chapple et al. | |
| 2009/0277142 A1 | 11/2009 | Wenckel | |
| 2010/0054853 A1 | 3/2010 | Jesse | |
| 2013/0142563 A1 * | 6/2013 | Sumi | F16B 7/1418 |
| | | | 403/109.1 |

FOREIGN PATENT DOCUMENTS

| | | | |
|---|---|---|---|
| JP | 2004073031 A1 | 3/2004 | |
| JP | 5742089 B2 | 7/2015 | |

* cited by examiner

MANUALLY GUIDED IMPLEMENT

CROSS-REFERENCE TO RELATED APPLICATIONS

The present application claims priority of DE 10 2018 000 975.1, filed Feb. 7, 2018, the priority of this application is hereby claimed and this application is incorporated herein by reference.

BACKGROUND OF THE INVENTION

The invention relates to a manually guided implement.

A manually guided implement, specifically a brush cutter, which has a guide tube is known from DE 100 34 437 A1. A housing in which a drive motor is disposed is disposed at one end of the guide tube. The tool of the brush cutter is disposed on the other end of the guide tube. A drive shaft for driving the tool protrudes through the guide tube. A damping element is disposed between the guide tube and the housing of the drive motor.

It has been demonstrated that oscillations can arise during operation, in particular in the case of implements having a long guide tube, for example in the case of hedge trimmers or pole cutters or the like, despite the guide tube being linked to the housing by way of an antivibration element.

It is also known for guide tubes of manually guided implements to be provided with a telescopic installation which enables a length-adjustment of the guide tube. To this end, the guide tube is usually composed of at least two sub-portions which can be retracted into one another or be extracted from one another and be mutually braced at desired positions. The mutual fastening of the two sub-portions of the guide tube herein is embodied so as to be tight and dimensionally stable. It has been demonstrated that the guide tube, when in operation, by way of exciter forces can be excited in terms of flexural oscillations. Said oscillations are transmitted to the gripping locations.

SUMMARY OF THE INVENTION

The invention is based on the object of achieving a manually guided implement of the generic type which enables an ergonomic operation.

This object is achieved by a manually guided implement having a guide tube, wherein a first mass body is disposed on a first end of the guide tube, wherein a second mass body is disposed on a second end of the guide tube, wherein one of the mass bodies comprises at least one housing, and the other of the mass bodies comprises at least one tool, wherein the tool is driven by a drive motor, wherein means for the power transmission for driving the tool between the first end and the second end are guided in the interior of the guide tube, wherein a first antivibration element is disposed between the first end of the guide tube and the first mass body, wherein the guide tube in the direction of the longitudinal central axis thereof comprises at least one first rigid sub-portion and one second rigid sub-portion, and wherein the two sub-portions are connected to one another at an abutment location, wherein the first sub-portion and the second sub-portion at the abutment location are connected to one another by way of at least one second antivibration element.

The positioning of the gripping locations on the guide tube for ergonomic reasons is usually predefined within tight limits. On account thereof, the positioning of the gripping locations for economic reasons is usually necessary in the region of oscillation troughs of the guide tube. In order for the oscillation amplitudes at the gripping locations to be reduced, the present invention provides that the mode of oscillation of the guide tube is modified. To this end it is provided that the guide tube in the longitudinal direction comprises at least one first rigid sub-portion and one second rigid sub-portion. The two sub-portions herein mutually overlap at most partially such that both the first rigid sub-portion as well as the second rigid sub-portion form in each case one longitudinal portion of the guide tube, the respective other rigid sub-portion not being disposed in said longitudinal portion of the guide tube. The two sub-portions are connected to one another at an abutment location. The two sub-portions at the abutment location are connected to one another in an oscillation-damping manner by way of at least one second antivibration element. Accordingly, the guide tube is not formed by one rigid tube or a plurality of rigidly interconnected sub-portions, as is the case in telescopic tubes. Rather, the guide tube is divided into at least two rigid sub-portions which are connected by way of an antivibration element, thus an elastic element. The antivibration element herein is in particular a spring/damper element, thus an element which possesses resilient properties as well damping properties. The guide tube can comprise further sub-portions which are rigidly connected to the first sub-portion or the second sub-portion or by way of one or a plurality of antivibration elements.

The mode of oscillation of the guide tube can be modified in a simple manner on account of the connection of the two rigid sub-portions of the guide tube by way of at least one antivibration element. The mode of oscillation of the guide tube herein is advantageously modified such that a gripping location on the guide tube is not disposed in the region of an oscillation trough. The configuration of the guide tube from at least two sub-portions can overall also have the effect of reducing the amplitude of the oscillations.

The two sub-portions advantageously possess an invariable overall length. In a preferred design embodiment, the two rigid sub-portions are accordingly portions of a telescopic installation which are not mutually displaceable. In an alternative design embodiment it can however be provided that the overall length of the two sub-portions is variable, the two sub-portions thus being in particular portions of a telescopic device. As opposed to known telescopic installations, the two rigid sub-portions are however not rigidly connected to one another but by way of the at least one second antivibration element.

The overall length of the guide tube, measured in the longitudinal direction, is in particular larger than the length of each of the two sub-portions, measured in the longitudinal direction. Accordingly, none of the sub-portions extends across the overall length of the guide tube. Each of the sub-portions configures a separate longitudinal portion of the guide tube.

The second antivibration element is advantageously at least in part composed of an elastomer. The elastomer can in particular be rubber. The second antivibration element can advantageously be completely composed of elastomer.

In an advantageous design embodiment the abutment location is disposed outside the two mass bodies. The abutment location herein is advantageously disposed between the mass bodies. On account thereof, the length of each sub-portion is smaller than the overall length of the guide tube, such that another mode of oscillation than in the case of a guide tube composed of only one sub-portion results.

The second sub-portion possesses an end side which faces the first mass body and which in relation to the first mass body has a spacing which is smaller than one third, in particular smaller than one fifth, preferably smaller than one tenth, of the spacing between the first mass body and the second mass body. The second antivibration element is accordingly disposed so as to be eccentric between the two mass bodies. In the case of a guide tube having a telescopic installation, the spacing between the first mass body and the second mass body is the spacing of the two mass bodies at the maximum length of the guide tube, thus at a fully extended telescopic installation.

In an advantageous design embodiment the first sub-portion, in the region of the abutment location, in the longitudinal direction of the guide tube engages across the second sub-portion. On account thereof, the guide tube in the region of the abutment location, despite the antivibration element disposed between the sub-portions, possesses a sufficient rigidity. The first sub-portion prevents in particular any kinking of the guide tube at the abutment location. A simple construction results when the second antivibration element, in terms of the longitudinal axis of the guide tube, in the radial direction is disposed between the first sub-portion and the second sub-portion.

In an alternative design embodiment it is advantageously provided that the mutually facing end sides of the first sub-portion and of the second sub-portion in the longitudinal direction of the guide tube are disposed beside one another in an overlap-free manner. The second antivibration element, in terms of the longitudinal direction, is advantageously disposed radially outside the first sub-portion and the second sub-portion. The second antivibration element herein advantageously bears on at least one sub-portion, in particular on both sub-portions. Alternatively, it can advantageously be provided that the second antivibration element in terms of the longitudinal direction is disposed radially within the first sub-portion and the second sub-portion, and that the second antivibration element bears in particular on at least one sub-portion, preferably on both sub-portions. It can also be provided that a second antivibration element is disposed radially outside the sub-portions, and a further second antivibration element is disposed radially within the sub-portions. Alternatively or additionally, it is advantageously provided that the second antivibration element is disposed between mutually facing end sides of the first sub-portion and of the second sub-portion. The second antivibration element herein can be in part or completely disposed between the end sides of the sub-portions. The second antivibration element can advantageously be in part disposed between the end sides of the sub-portions and in part radially within and/or radially outside the sub-portions.

In an advantageous design embodiment the second antivibration element is connected in a rotationally fixed manner to the first sub-portion and in a rotationally fixed manner to the second sub-portion. On account thereof, the two sub-portions by way of the antivibration element are resiliently connected in a rotationally fixed manner to one another. On account thereof, torsional forces of the guide tube can be transmitted by way of the antivibration element.

In an advantageous design embodiment the second antivibration element is fixed by way of a fastening device. The fastening device possesses in particular a lower rigidity than the guide tube away from the abutment location and away from the antivibration element. The rigidity of the antivibration element is advantageously lower than the rigidity of the fastening device. The rigidity of the fastening device is advantageously lower than the rigidity of the guide tube away from the abutment location and away from the antivibration element, thus in a longitudinal portion of the guide tube in which the abutment location and the antivibration element do not extend. On account thereof, a reduced rigidity of the guide tube results at the abutment location, said reduced rigidity leading to a modification of the mode of oscillation of the guide tube. In an advantageous design embodiment the elasticity of the fastening device is higher than that of the guide tube away from the abutment location.

Mutually securing the sub-portions in the direction of the longitudinal central axis of the guide tube is advantageously performed by the fastening device. On account thereof, no additional means are required for securing the mutual axial positions of the portions. In an advantageous design embodiment the fastening device is fixed at least on a sub-portion, in particular on both sub-portions, by means of a fastening element. In a particularly preferred design embodiment the fastening device is configured as a grip. On account thereof, no additional elements are required for the fastening device. The grip in a particularly preferred design embodiment encompasses the guide tube at the abutment location such that abutment location is obscured and not visible to the operator.

The two sub-portions on the end side that faces the first mass body advantageously have identical external diameters. Both sub-portions can therefore be assembled on the first mass body. On account thereof, retrofitting existing guide tubes by way of a second sub-portion is possible in a simple manner. No modification of the constructive dimensions of the fastening location of the second mass body on the guide tube is required by virtue of the design embodiment of the guide tube from two sub-portions.

In a preferred design embodiment the first mass body comprises the housing and the second mass body comprises the tool. The first antivibration element is accordingly disposed between the guide tube and the housing. The abutment location is preferably disposed so as to be closer to the housing than to the tool. However, it can also be provided that the abutment location is disposed so as to be closer to the tool than to the housing. It can also be provided that the antivibration element is disposed between the guide tube and the tool.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
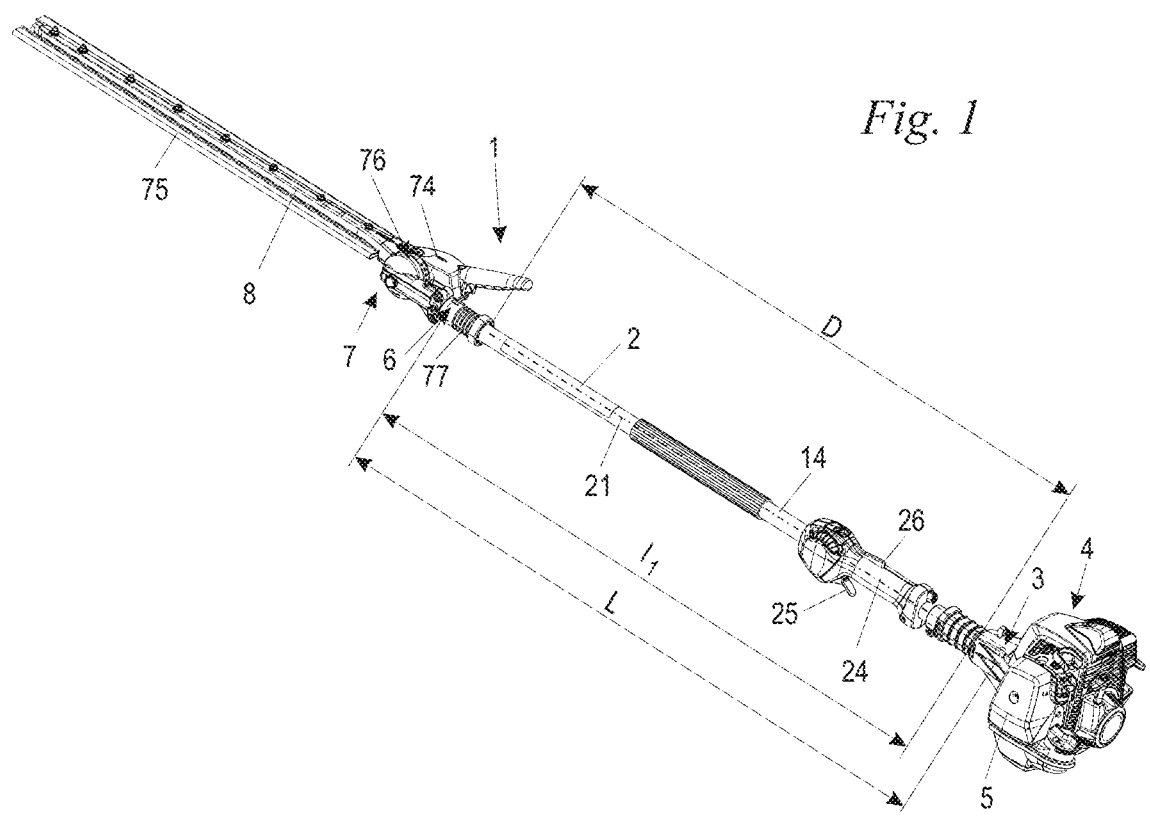
FIG. 1 shows a perspective illustration of a hedge trimmer.

FIG. 1 in a perspective illustration shows an implement 1, in the exemplary embodiment a hedge trimmer. The implement 1 possesses a first mass body 4 and a second mass body 7, said mass bodies 4, 7 being connected to one another by way of a guide tube 2. Instead of a hedge trimmer 1, the implement 1 can also be another implement having a guide tube 2, for example a pole cutter, a brush cutter, a strimmer, or the like. The first mass body 4 comprises a housing 5 in which a drive motor (not shown in FIG. 1) is disposed in the exemplary embodiment. The first mass body 4 is disposed on a first end 3 of the guide tube 2. The second mass body 7 is disposed on a second end 6 of the guide tube 2. The second mass body 7 in the exemplary embodiment comprises a tool 8 of the hedge trimmer, said tool 8 in the exemplary embodiment comprising cutter bars (not shown) that are driven in a reciprocating opposing manner. A cutting protection 75 is disposed on the counter bars in the illustration in FIG. 1.

The tool 8 is connected to the second end 6 of the guide tube 2 by way of a gearbox housing 74. The gearbox housing 74 is also part of the second mass body 7. The gearbox housing 74 comprises an adjustment mechanism 76 by way of which the alignment of the tool 8 in relation to the guide tube 2 is adjustable. An adjustment sleeve 77 which is mounted on the guide tube 2 so as to be displaceable in the direction of a longitudinal central axis 21 of the guide tube 2 is provided for releasing and fixing the adjustment mechanism 76. The adjustment sleeve 77 is also part of the second mass body 7.

In an alternative embodiment it can also be provided that the first mass body 4 comprises the tool 8 and in particular also the gearbox housing 74, and that the second mass body 7 comprises the housing 5.

The first mass body 4 and the second mass body 7 possess a mutual spacing D, measured parallel to the longitudinal central axis 21, said spacing D being 0.5 m to 3.5 m, for example. The guide tube 2 in the exemplary embodiment possesses an un-adjustable length. However, it is also known for guide tubes 2 to be provided with a telescopic installation which permits an adjustment of the length of the guide tube 2. The guide tube 2 possesses an overall length L. The overall length L is adjustable in the case of guide tubes 2 having a telescopic installation. The spacing D between the mass bodies 4 and 7 in the case of guide tubes 2 having a telescopic installation is the maximum spacing of the mass bodies 4 and 7, thus the spacing at a fully extended telescopic installation. The overall length L of the guide tube 2 is measured between the ends 3 and 6 of the guide tube 2. In order for the mass bodies 4 and 7, respectively, to be fixed to the guide tube 2, the guide tube 2 protrudes into the mass bodies 4 and 7 such that the overall length L is larger than the spacing D of the mass bodies 4 and 7.

The guide tube 2 possesses a first sub-portion 13 (shown in FIG. 2) as well as a second sub-portion 14 (also shown in FIG. 1), said sub-portions 13 and 14 yet to be explained in more detail hereunder. The second sub-portion 14 possesses a length l1, measured parallel to the longitudinal central axis 21. A handle 24 is disposed on the guide tube 2, so as to neighbor the first mass body 4. The handle 24 in the exemplary embodiment encloses the guide tube 2. Operating elements 25 and 26 are provided on the handle 24. The operating element 25 in the exemplary embodiment is a throttle lever.

Figure 2:
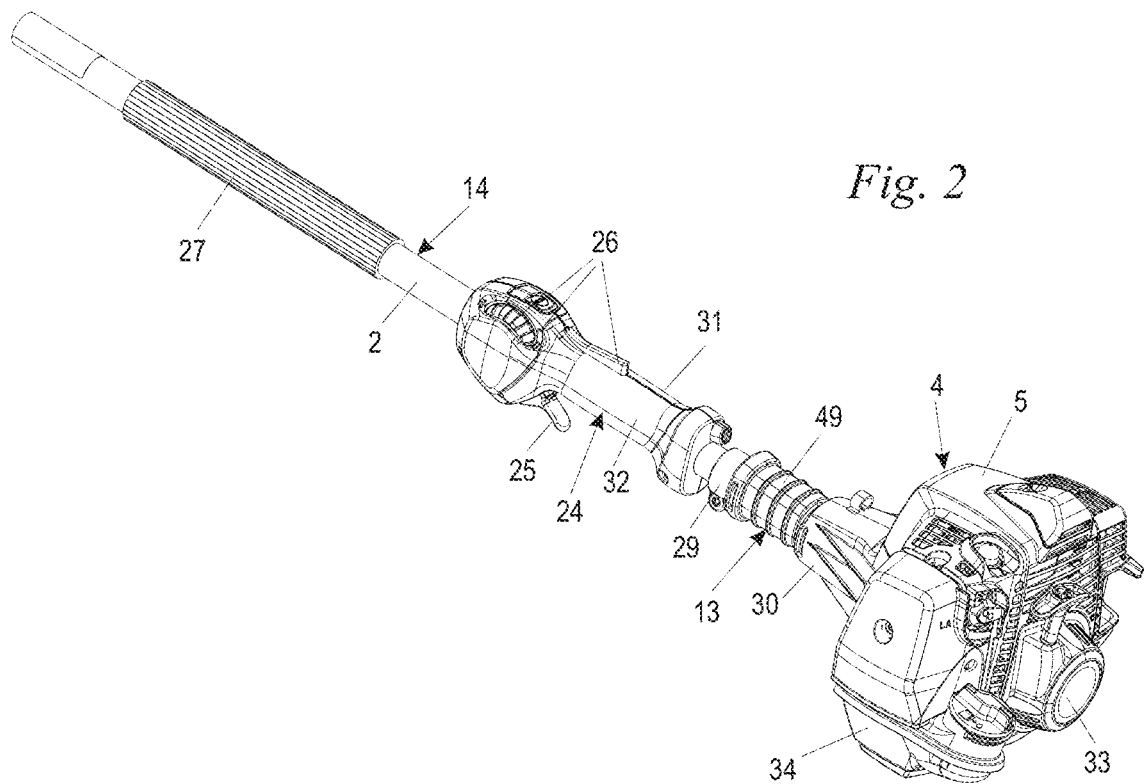
FIG. 2 shows the region of the housing of the hedge trimmer from FIG. 1 in an enlarged perspective illustration.

As is shown in the enlarged illustration in FIG. 2, the first mass body 4 comprises a starter device 33 disposed on the housing 5, in the exemplary embodiment a pull starter. The first mass body 4 moreover comprises a fuel tank 34. The first end 3 of the guide tube 2 is held in a receptacle connector 30 of the housing 5. A receptacle portion 49 which will yet be described in more detail is disposed so as to neighbor the receptacle connector 30. The receptacle portion 49 is part of a first sub-portion 13 of the guide tube 2. The receptacle portion 49 in the exemplary embodiment is the longitudinal portion of the first sub-portion 13 which possesses an enlarged external diameter and into which the second sub-portion 14 protrudes. A clamp 29 of the second sub-portion 14 is disposed on the receptacle portion 49 on the side that faces away from the housing 5. As is also shown in FIG. 2, the handle 24 is composed of two grip shells 31 and 32. The operating elements 26 in the exemplary embodiment comprise a throttle lever lock, an operating wheel for fixing the operating element 25, thus the throttle lever, in desired positions, as well as a stop switch. Other or further operating elements 26 can also be advantageous. As is also shown in FIG. 2, a sheathing 27 which extends across a sub-portion of the overall length L of the guide tube 2 and which likewise can serve as a grip region is disposed on the guide tube 2 between the handle 24 and the second mass body 7 (FIG. 1).

Figure 3:
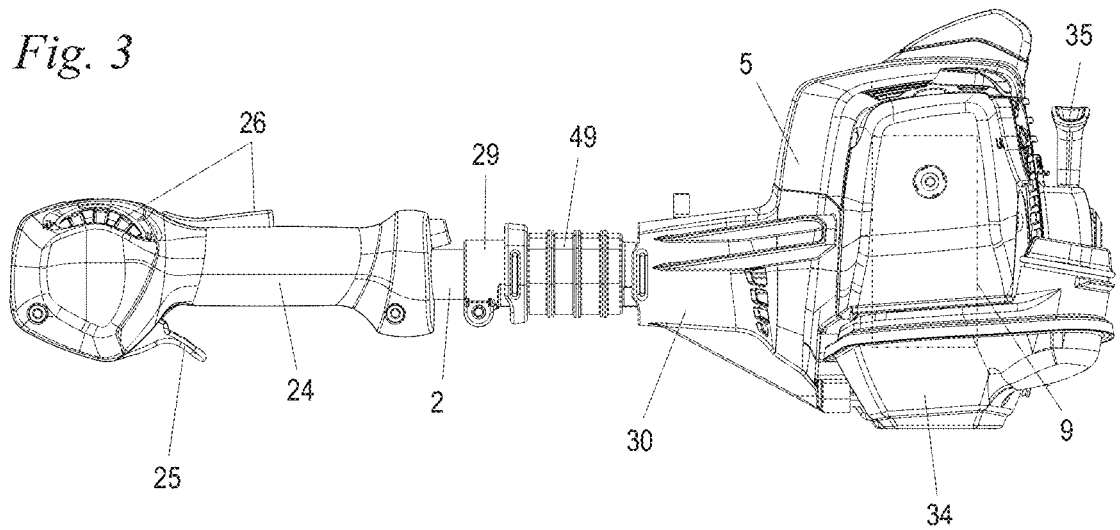
FIG. 3 shows the region of the housing of the hedge trimmer in a side view.

As is schematically shown in FIG. 3, a drive motor 9 is disposed in the housing 5. The drive motor 9 in the exemplary embodiment is an internal combustion engine, in particular a two-stroke engine or a mixture-lubricated four-stroke engine. The drive motor 9 is in particular a single-cylinder engine. The starter device 33 shown in FIG. 2 serves in particular for starting the drive motor 9. The starter device 33 possesses a starter handle 35 which is shown in FIG. 3 and protrudes from the housing 5.

Figure 4:
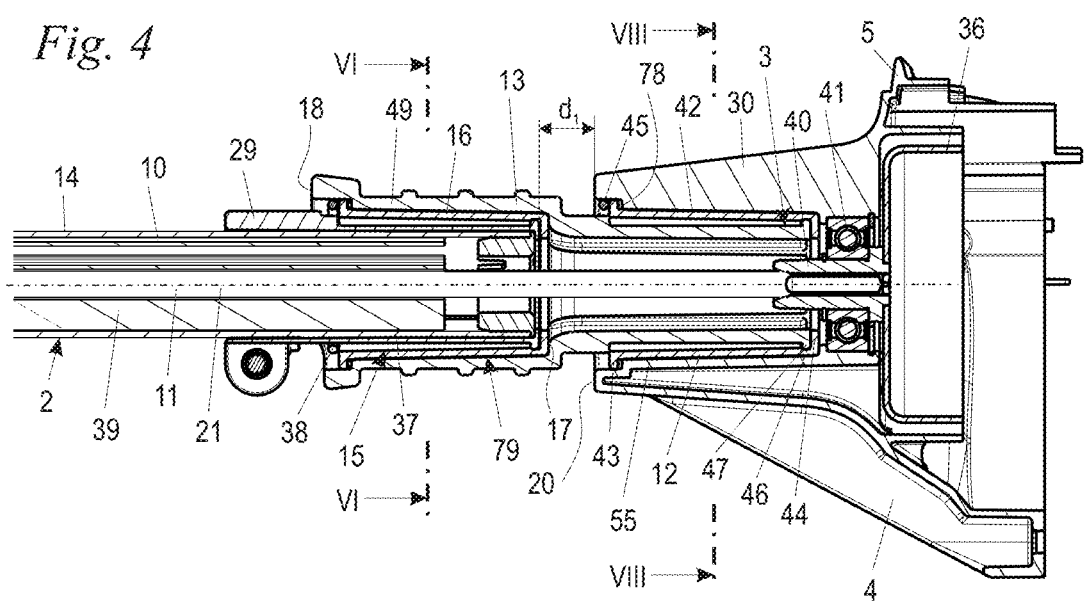
FIG. 4 shows a fragmented sectional illustration through the housing and the guide tube of the hedge trimmer.

FIG. 4 shows a section through the housing 5 and the region of the guide tube 2 that is disposed so as to neighbor the housing 5. As is shown in FIG. 4, a clutch drum 36 which is part of a centrifugal clutch is disposed in the housing 5. The clutch drum 36 above a coupling rotating speed connects a crankshaft of the drive motor 9 and means 11 for power transmission, in the exemplary embodiment to a drive shaft. The means 11 for power transmission is guided in the interior 10 of the guide tube 2 and protrudes through the guide tube 2 from the first mass body 4 to the second mass body 7 (FIG. 1). As is also shown in FIG. 4, a drive sleeve 40 into which the means 11 for power transmission protrudes is fixed to the clutch drum 36. The drive sleeve 40 by way of a bearing 41 is rotatably mounted in the receptacle connector 30 of the housing 5.

A housing receptacle 42 which in the exemplary embodiment is configured as an elongate depression is configured in the receptacle connector 30 of the housing 5. The housing receptacle 42 in the direction toward the free end thereof possesses a rim 78 on which the diameter widens. An outwardly protruding periphery 43 of a first antivibration element 12 of the implement 1 bears on the rim 78. The first antivibration element 12 is configured so as to be pot-shaped and on the end that faces away from the second mass body 7 (FIG. 1), in the exemplary embodiment the end that faces the drive motor 9 (FIG. 3), possesses a base 44 which is configured as an inwardly protruding periphery. The drive sleeve 40 protrudes through a centric opening in the base 44. A depression 46 into which an outwardly protruding rim 47 of the first sub-portion 13 of the guide tube 2 protrudes is configured in the interior of the first antivibration element 12, so as to neighbor the base 44. On account thereof, the first sub-portion 13 in the housing receptacle 42 is secured in the direction of the longitudinal central axis 21. A holding ring 45 is provided in order for the position of the antivibration element 12 to be secured in the direction of the longitudinal central axis 21 in the housing receptacle 42. On account thereof, the antivibration element 12 cannot be extracted from the housing receptacle 42. As is shown in FIG. 4, the first antivibration element 12 possesses and main body 55 which is configured as a hollow cylinder and on which the base 44 and the periphery 43 are configured.

The guide tube 2 in the exemplary embodiment is configured from the two sub-portions 13 and 14. The first sub-portion 13 is disposed on the first mass body 4, specifically plug-fitted into the housing receptacle 42. The second sub-portion 14 extends up to the second mass body 7 (FIG. 1). The two sub-portions 13 and 14 are connected to one another at an abutment location 15, specifically by way of a second antivibration element 16. In the exemplary embodiment, the first sub-portion 13 by way of the receptacle portion 49 thereof engages across the second sub-portion 14. A sub-portion receptacle 79 is configured in the receptacle portion 49. The shape and the dimensions of the sub-portion receptacle 79 in the exemplary embodiment are configured so as to be identical to the shape and the dimensions of the housing receptacle 42 such that the second sub-portion 14 is capable of being fitted in the housing receptacle 42 instead of the first sub-portion 13. An inner sleeve 37 which is configured so as to be integral to the clamp 29 protrudes into the second antivibration element 16. The inner sleeve 37 and the clamp 29 are part of the second sub-portion 14 of the guide tube 2, and are fixedly connected to a tubular portion 87 of the second sub-portion 14. A holding ring 38 is provided in order for the antivibration element 16 to be secured in the sub-portion receptacle 79, the design embodiment of said holding ring 38 advantageously corresponding to that of the holding ring 45.

The first sub-portion 13 by way of the region thereof that is contiguous to the receptacle portion 49 of said first sub-portion 13 and is in part disposed in the housing receptacle 42 extends in another longitudinal portion of the guide tube 2 than the second sub-portion 14. The first sub-portion 13, at least by way of one portion, lies so as to be axially behind the second sub-portion 14. The second sub-portion 14 possesses an end side 17 that faces the first mass body 4. The end side 17 in relation to an end side 20 of the mass body 4 that lies so as to face the second mass body 7 (FIG. 1) has a spacing d1, measured in the direction of the longitudinal axis 21. The spacing d1 is advantageously at least 1 cm. The first sub-portion 13 accordingly breaches a spacing which is formed between the second sub-portion 14 and the first mass body 4.

As is also shown in FIG. 4, the means 11 for power transmission is mounted in a guide 39 in the second sub-portion 14 of the guide tube 2. The guide 39 is configured as a so-called liner and in the exemplary embodiment extends across a large part of the length of the second sub-portion 14.

Figure 5:
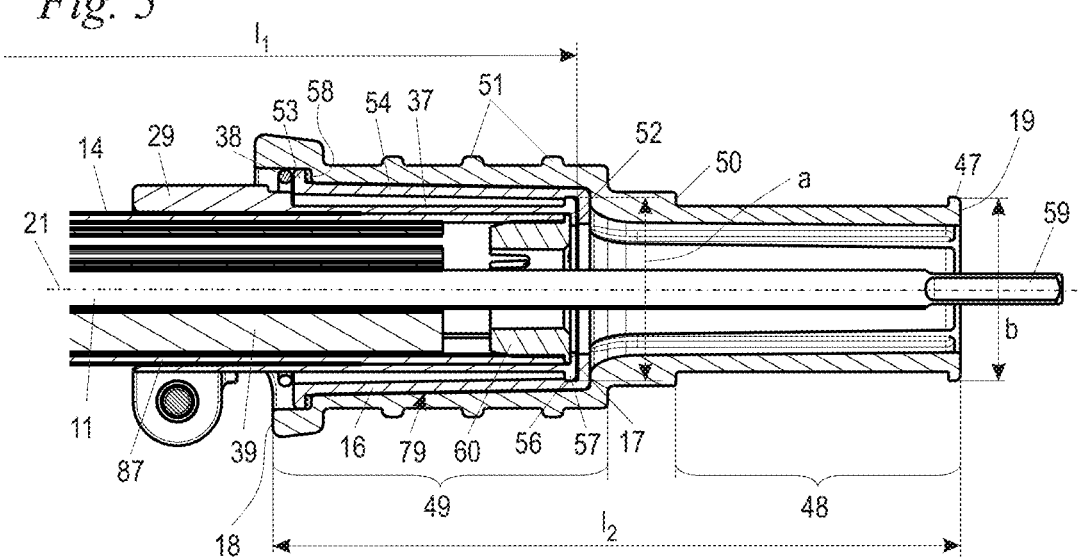
FIG. 5 shows a sectional illustration of the portion of the first sub-portion on the side of the housing, and of the second sub-portion of the guide tube of the hedge trimmer.

The enlarged illustration in FIG. 5 shows the disposal of the second sub-portion 14 in the first sub-portion 13 in detail. The clamp 29 having the inner sleeve 37 is fixedly connected to the tubular portion 87 of the second sub-portion 14. The inner sleeve 37 on that end that faces the mass body 4 has an outwardly protruding rim 57 which protrudes into a depression 56 in the antivibration element 16. The rim 57 and the depression 56 are configured so as to be identical to the ring 47 and the depression 46 (FIG. 4) on the first sub-portion 13 and on the first antivibration element 12. The second antivibration element 16 possesses a periphery 53 which bears on a ring 58 in the sub-portion receptacle 79. The internal diameter of the sub-portion receptacle 79 on the rim 58 widens in the direction toward the second mass body 7 (FIG. 1). The internal diameter of the sub-portion receptacle 79 from the base of the sub-portion receptacle 79 widens toward the free end of the sub-portion receptacle 79.

As is shown in FIG. 5, the second antivibration element 16 possesses a main body 54 which is configured as a hollow cylinder and on which a base 52 as well as the outwardly protruding periphery 53 are molded. As is also shown in FIG. 5, a stopper 60 which is fixed in the direction of the longitudinal central axis 21 by the inner sleeve 37 is push-fitted in that end of the second sub-portion 14 that faces the mass body 4. The first sub-portion 13 in the region of the receptacle portion 49 possesses elevations 51 which enable the guide tube 2 in the region of the receptacle portion 49 to be positively gripped. As is also shown in FIG. 5, the second sub-portion 14 on the end side 17 thereof that faces the first mass body 4 possesses an external diameter a which corresponds to an external diameter b of the first sub-portion 13, likewise on the end side 19 of the latter that faces the first mass body 4. The end side 19 herein is that end side of the first sub-portion 13 that protrudes into the first mass body 4 and faces away from the second mass body 7.

The first sub-portion 13 possesses an engagement portion 48 which is disposed in the housing receptacle 42 of the housing 5. The receptacle portion 49 is also shown in FIG. 5. A spacing is formed between the engagement portion 48 and the receptacle portion 49. The engagement portion 48 on that side that faces the receptacle portion 49 possesses a shoulder 50 which is provided for bearing on the first antivibration element 12 and which protrudes into the housing receptacle 42, as is shown in FIG. 4.

As is shown in FIG. 5, the first sub-portion 13 possesses an end side 18 that faces away from the first mass body 4 and faces the second mass body 7. The end side 18 is more remote from the first mass body 4 than the end side 17 of the second sub-portion 14 that faces the first mass body 4. The sub-portions 13 and 14 accordingly mutually overlap, specifically in the receptacle portion 49 of the first sub-portion 13. The second sub-portion 14 possesses the length l1, measured in the direction of the longitudinal central axis 21. The length l1 is measured up to the end side 17. The end side 17 in the exemplary embodiment lies within the sub-portion receptacle 79. The first sub-portion 13 possesses a length l2, measured parallel to the longitudinal central axis 21 between the end sides 18 and 19 of said first sub-portion 13, said length l2 being significantly smaller than the length l1.

As is shown in FIGS. 1 and 4, the abutment location 15 is disposed outside the two mass bodies 4 and 7, so as to be between the mass bodies 4 and 7. The overall length L of the guide tube 2, measured in the direction of the longitudinal central axis 21, is larger than the length l1 of the second sub-portion 14, measured in the direction of the longitudinal central axis 21, and larger than the length l2 of the first sub-portion 13, measured in the direction of the longitudinal central axis 21. The spacing d1 between the end side 17 of the second sub-portion 14 and the first mass body 4 is smaller than one third of the spacing D between the mass bodies 4 and 7. The spacing d1 is in particular smaller than one fifth, preferably smaller than one tenth, of the spacing D.

As is also shown in FIG. 5, the means 11 for power transmission on the end disposed on the first mass body 4 possesses an engagement pin 59 which for transmitting the drive torque has a geometry for the rotationally fixed connection to the drive sleeve 40. The engagement pin 59 in the exemplary embodiment possesses a square-shaft cross section. Other non-round cross sections can however also be advantageous.

Figure 7:
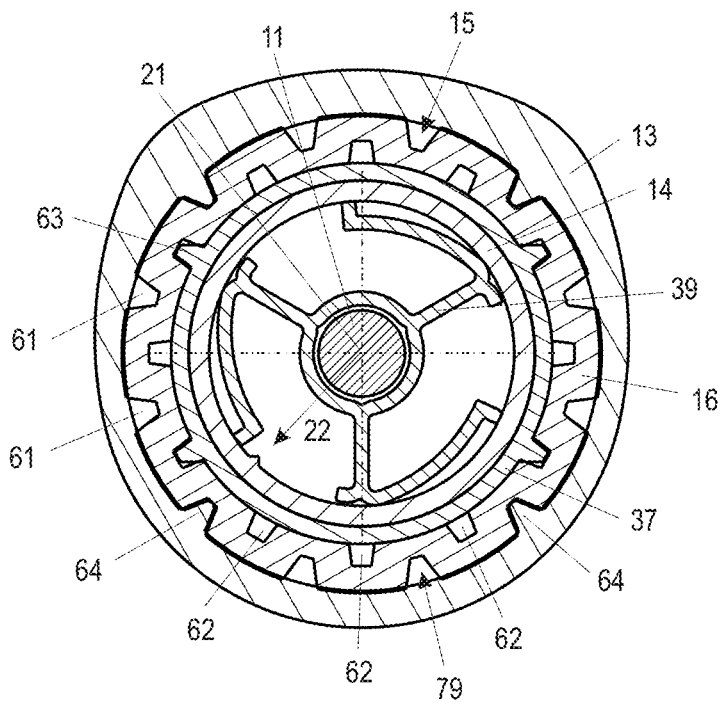
FIG. 7 shows an enlarged illustration of the region of the guide tube of the sectional illustration from FIG. 6.

As is shown in FIG. 7, that part of the housing 5 that supports the receptacle connector 30 is fixedly connected to further parts of the housing 5 by way of fastening screws 65. The receptacle connector 30 is accordingly part of the housing 5.

Figure 6:
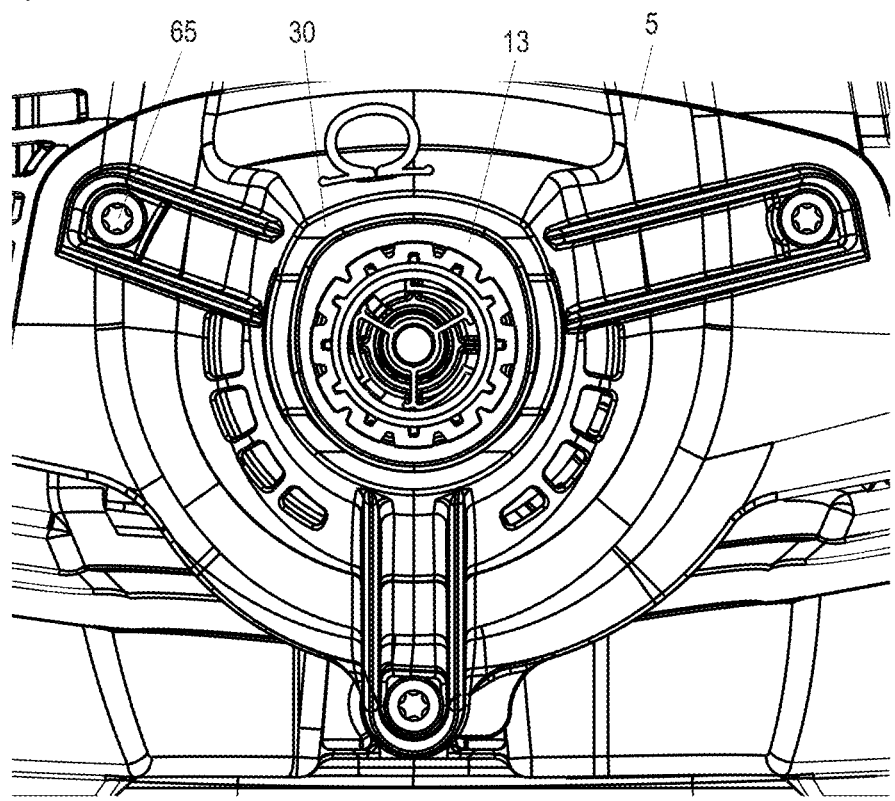
FIG. 6 shows a schematic sectional illustration along the line VI-VI in FIG. 4.

FIG. 6 shows a section through the guide tube 2 in the region of the receptacle portion 49 of the first sub-portion 13, thus through the antivibration element 16. As is shown in FIG. 7, the sub-portion receptacle 79 does not possess a circular cross section but has inwardly protruding longitudinal ribs 64 that are uniformly distributed across the circumference. Four longitudinal ribs 64 are provided in the exemplary embodiment. The antivibration element 16 on the external circumference thereof has external depressions 61, the shape of the latter corresponding to the longitudinal ribs 64. The longitudinal ribs 64 and the external depressions 61 in the exemplary embodiment run parallel to the longitudinal central axis 21. However, the number of external depressions 61 is greater than that of the longitudinal ribs 64. Twelve external depressions 61 are provided in the exemplary embodiment. The antivibration element 16 moreover possesses internal depressions 62 that run in the direction of the longitudinal central axis 21. The external depressions 61 and the internal depressions 62 in the exemplary embodiment possess an approximately trapezoidal cross-section. Longitudinal ribs 63 of the inner sleeve 37 of the second sub-portion 14 protrude into the internal depressions 62. The internal depressions 62 and the external depressions 61 in the exemplary embodiment in the circumferential direction are disposed so as to be distributed in an alternating manner and at a uniform mutual spacing across the entire circumference.

The guide tube 2 possesses a multiplicity of radial directions 22 which extend in a perpendicular and radially outward manner from the longitudinal central axis 21. The vibration element 16 is disposed in each radial direction 22 between the second sub-portion 14 and the first sub-portion 13. The antivibration element 16 is connected in a rotationally fixed manner to the first sub-portion 13 by way of the external depressions 61 and by way of the longitudinal ribs 64 that engage in the external depressions 61. The antivibration element 16 is connected in a rotationally fixed manner to the second sub-portion 14 by way of the longitudinal ribs 63 and by way of the internal depressions 62 of the antivibration element 16. On account thereof, torques about the longitudinal central axis 21 can also be transmitted by way of the antivibration element 16. It can be provided that the longitudinal ribs 63 and the longitudinal ribs 64 mutually overlap in the radial direction 22, thus that the spacing of the longitudinal ribs 64 from the longitudinal central axis 21 is smaller than the largest spacing of the longitudinal ribs 63 from the longitudinal central axis 21.

FIG. 7 also shows the design embodiment of the guide 39. The guide 39 possesses individual arms which protrude in the radial direction 22 and which extend between a region that surrounds the means 11 for power transmission, specifically the driveshaft, and the second sub-portion 14. Any other design embodiment of a guide 39 can also be advantageous.

Figure 8:
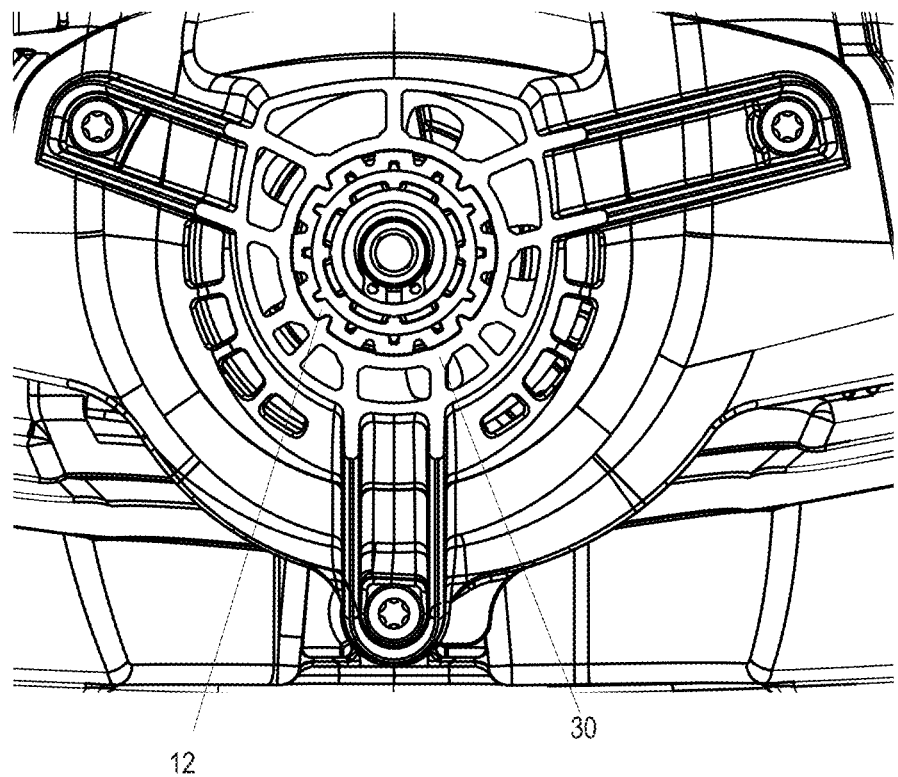
FIG. 8 shows a section along the line VIII-VIII in FIG. 4.
Figure 9:
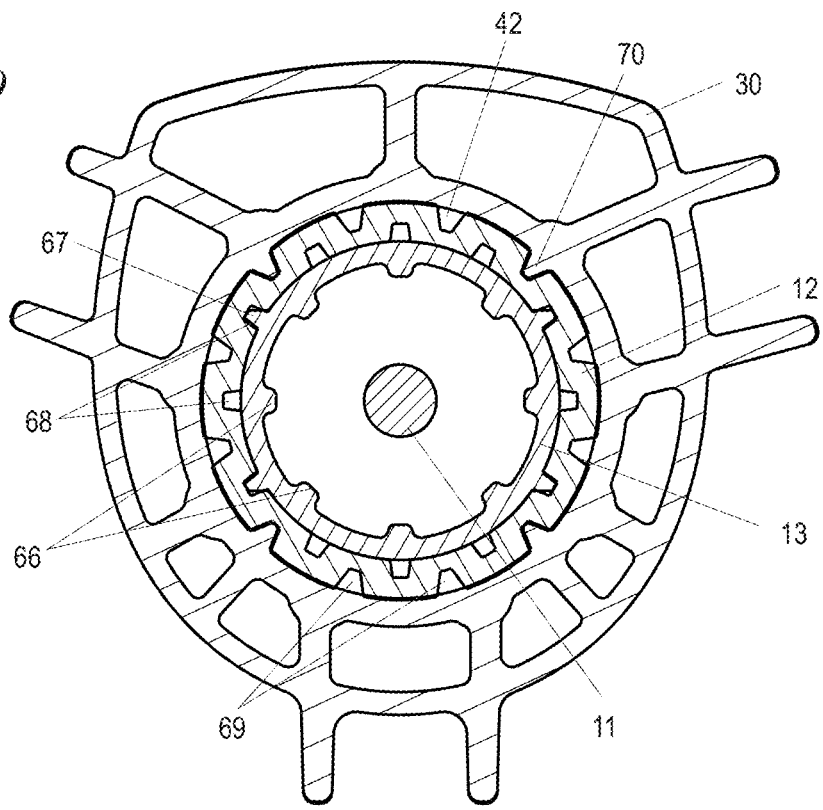
FIG. 9 shows an enlarged illustration of the region of the guide tube of the sectional illustration from FIG. 8.

FIGS. 8 and 9 show a section through the guide tube 2 in the region of the first antivibration element 12 and of the receptacle connector 30. The first antivibration element 12 is also connected in a rotationally fixed manner both to the receptacle connector 30 of the housing 5 as well as to the first sub-portion 13. To this end, the first sub-portion 13 possesses longitudinal ribs 67 which protrude in a radially outward manner and which protrude into corresponding internal depressions 68 of the first antivibration element 12. The first antivibration element 12 on the external circumference thereof possesses external depressions 69 into which the longitudinal ribs 70 of the housing receptacle 42 protrude. Reinforcement ribs 66 which advantageously lie in continuation of the longitudinal ribs 64 (FIG. 8) are provided on the internal side of the first sub-portion 13. The internal depressions 68 and the external depressions 69 in the exemplary embodiment are configured as grooves that run in the direction of the longitudinal central axis 21. The longitudinal ribs 67 and 70 are configured as webs that run parallel to the longitudinal central axis 21.

The second antivibration element 16 in the exemplary embodiment as per FIGS. 1 to 9 is disposed so as to be closer to the first mass body 4 than to the second mass body 7. The abutment location 15 in the exemplary embodiment is disposed so as to be closer to the housing 5 than to the tool 8. However, in an alternative design embodiment it can also be provided that the second antivibration element 16 is disposed so as to be closer to the second mass body 7 than to the first mass body 4. The abutment location in the alternative design embodiment is disposed so as to be closer to the tool 8 than to the housing 5. In the exemplary embodiment, the first antivibration element 12 is disposed between the first mass body 4 and the guide tube 2. Alternatively or additionally, it can be provided that a first antivibration element is disposed between the second mass body 7 and the guide tube 2.

Figure 10:
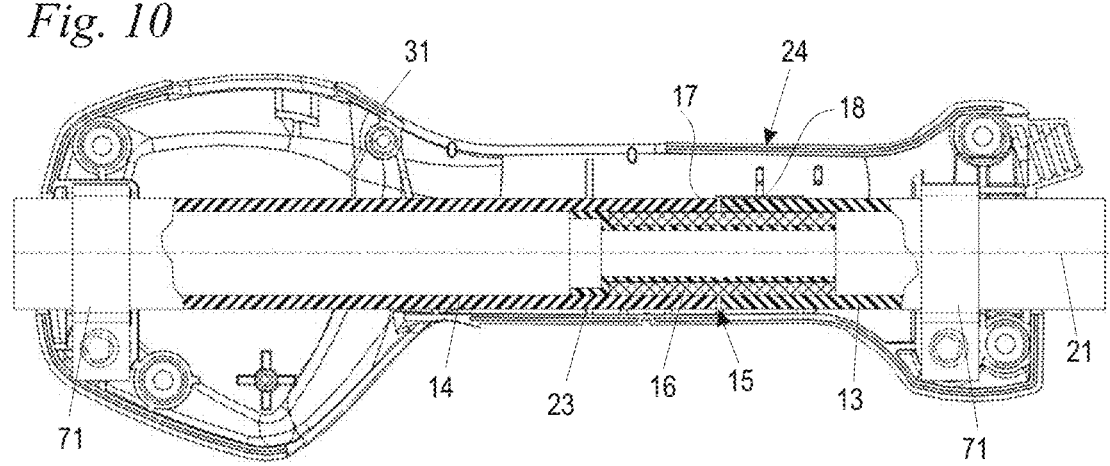
FIG. 10 shows a schematic fragmented, partially sectional illustration of an exemplary embodiment of the guide tube.

FIG. 10 shows an exemplary embodiment for an abutment location 15 between a first sub-portion 13 and a second sub-portion 14 of a guide tube 2. The abutment location 15 is disposed in a handle 24 of which only a grip shell 31 is shown in FIG. 10. The sub-portions 13 and 14 are axially fixed in relation to the handle 24 by way of clamps 71 that are disposed on both sides of the abutment location 15. At the abutment location 15, the sub-portions 13 and 14 by way of the mutually facing end sides 17 and 18 thereof lie beside one another in an overlap-free manner. The abutment location 15 is bridged by a second antivibration element 16 which is plug-fitted into the first sub-portion 13 and the second sub-portion 14. A fastening device 23 which in the exemplary embodiment is configured so as to be sleeve-shaped and protrudes into the sleeve-shaped antivibration element 16 serves for fixing the antivibration element 16. The fastening device 23 advantageously bears only on one of the sub-portions 13 or 14. The antivibration element 16 is disposed so as to be radially within the sub-portions 13 and 14. The fastening device 23 also bridges the abutment location 15. The abutment location 15 is moreover bridged by the handle 24.

The antivibration element 16 and the fastening device 23 are configured such that the rigidity of the guide tube 2 at the abutment location 15, thus the collective rigidity of the antivibration element 16 and of the fastening device 23, is lower than the rigidity of the sub-portions 13 or 14 in the regions outside the abutment location 15 and outside the antivibration element 16 and the fastening device 23. A leap in terms of rigidity of the guide tube 2 at the abutment location 15 results on account thereof.

Figure 11:
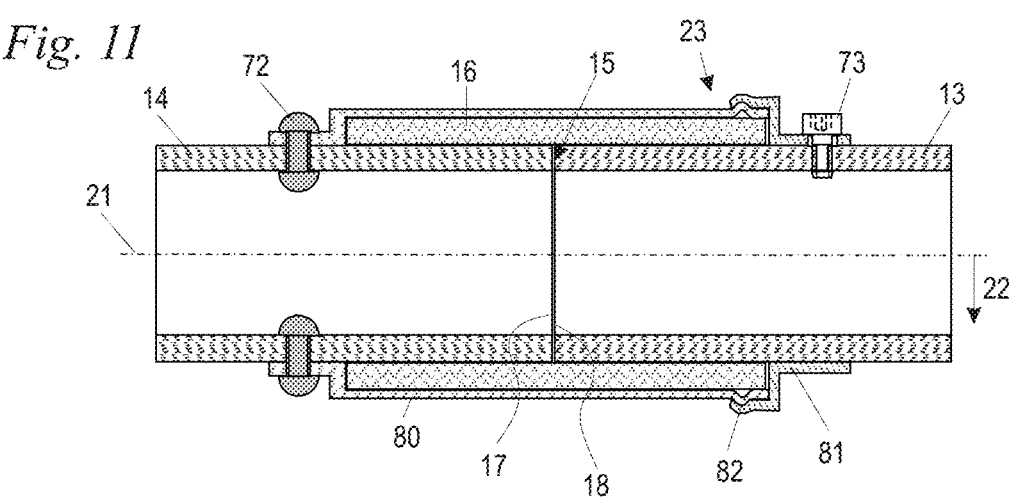
FIG. 11 to FIG. 14 show schematic sectional illustrations of exemplary embodiments of abutment locations of the guide tube.

FIG. 11 shows an exemplary embodiment for an abutment location 15 between two sub-portions 13 and 14 of a guide tube 2. The end sides 17 and 18 of the sub-portions 13 and 14 at the abutment location 15 lie beside one another in an overlap-free manner. The abutment location 15 is bridged by an antivibration element 16 which is configured so as to be sleeve-shaped and is disposed on the external circumference of the sub-portions 13 and 14. The antivibration element 16 in terms of the radial direction 22 lies thus outside the sub-portions 13 and 14. The sub-portions 13 and 14 protrude into the antivibration element 16. A fastening device 23 which comprises a first fastening sleeve 80 and a second fastening sleeve 81 is provided for fixing the antivibration element 16. The fastening sleeve 80 by way of fastening elements 72 is fixed to the second sub-portion 14. The fastening sleeve 81 by way of fastening elements 73 is fixed to the first sub-portion 13. In the exemplary embodiment the fastening elements 72 are rivets, and the fastening elements 73 are screws. Other fastening elements 72 and 73 can also be advantageous. The fastening sleeves 80 and 81 are connected to one another by way of a snap-fit connection 82. The fastening sleeves 80 and 81, and thus the sub-portions 13 and 14, are mutually fixed in the direction of the longitudinal central axis 21 by way of the snap-fit connection 82.

Figure 12:
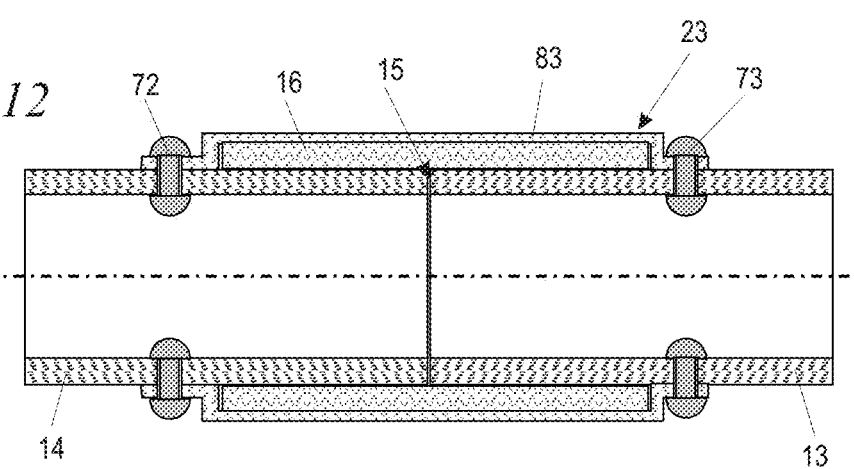

FIG. 12 shows a further exemplary embodiment in which the abutment location 15 is bridged by an antivibration element 16 as well as a fastening device 23. The fastening device 23 comprises a fastening sleeve 83 which conjointly with the antivibration element 16 bridges the abutment location 15. The fastening sleeve 83 by way of fastening elements 72 is fixed to the second sub-portion 14, and by way of fastening elements 73 is fixed to the first sub-portion 13. The fastening elements 72 and 73 in the exemplary embodiment are configured as rivets. The fastening sleeve 83 in a region that bridges the abutment location 15 possesses an enlarged internal diameter such that a receptacle space for the antivibration element 16 is formed between the sub-portions 13 and 14 and the fastening sleeve 83.

Figure 13:
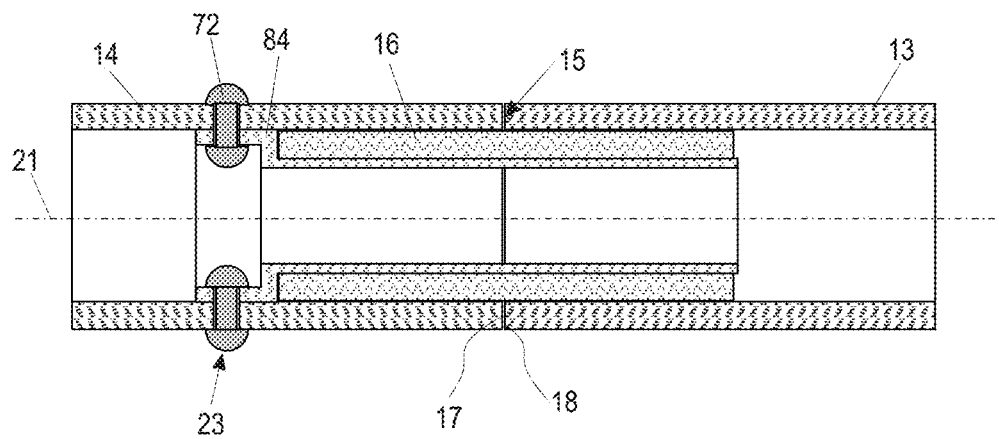

In the case of the exemplary embodiment shown in FIG. 13, the sub-portions 13 and 14 by way of the end sides 17 and 18 thereof likewise lie beside one another in an overlap-free manner. An antivibration element 16 which is configured so as to be sleeve-shaped and bridges the abutment location 15 is disposed in the interior of the sub-portions 13 and 14 at the abutment location 15. The antivibration element 16 by way of a fastening device 23 is fixed to the second sub-portion 14. The fastening device 23 comprises a fastening sleeve 84 which protrudes into the interior of the antivibration element 16 and which by way of fastening elements 72 is fixed to the second sub-portion 40. Fixing the fastening sleeve 84 to the first sub-portion 13 is not provided in the exemplary embodiment but can likewise be advantageous.

Figure 14:
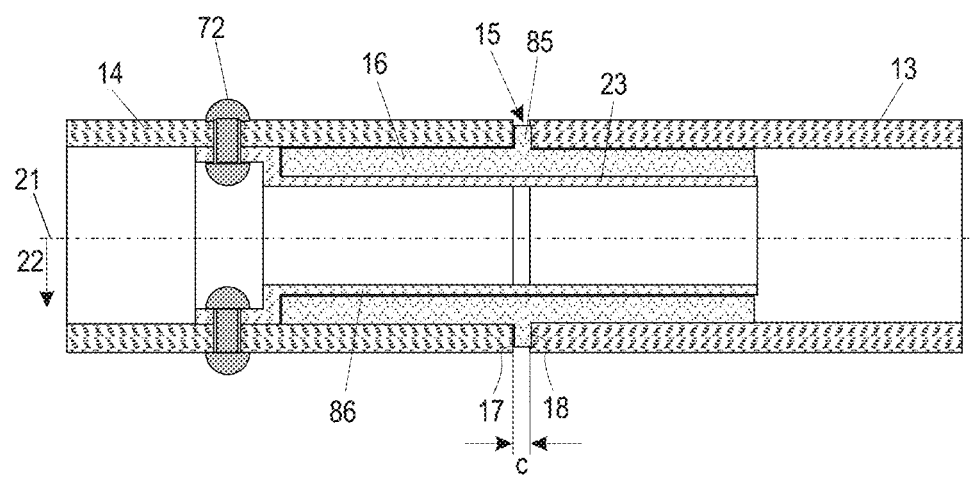

FIG. 14 shows a further exemplary embodiment of the disposal of an antivibration element 16 between two sub-portions 13 and 14. As is shown in FIG. 14, the end sides 17 and 18 of the sub-portions 13 and 14 in the direction of the longitudinal central axis 21 have a mutual spacing c. The end side 18 herein is disposed so as to be closer to the first mass body 4 (FIG. 1) than the end side 17. The two sub-portions 13 and 14 do not mutually overlap in the radial direction 22.

The antivibration element 16 possesses an outwardly protruding, thickened portion 85 which protrudes between the sub-portions 13 and 14. On account thereof, the sub-portions 13 and 14 in terms of oscillations are mutually decoupled not only in the radial direction 22 but also in the direction of the longitudinal central axis 21. A fastening device 23 which comprises a fastening sleeve 86 as well as fastening elements 72, rivets in the exemplary embodiment, is provided for fixing the antivibration element 16. The fastening sleeve 86 is disposed in the interior of the antivibration element 16.

The disposal of the fastening device 23 in all exemplary embodiments is performed such that sufficient installation space for the means 11 for power transmission remains in the region of the longitudinal central axis 21.

The antivibration elements 12 and 16 are at least in part composed of an elastomer, for example of rubber. The antivibration elements 12 and 16 possess resilient properties and on account thereof modify the mode of natural oscillation of the guide tube 2. Additionally, the antivibration elements 12 and 16 preferably also possess damping properties such that the amplitudes of the oscillations created are reduced. A rotationally fixed connection of the second antivibration element 16 to both sub-portions 13 and 14 can be advantageous in all exemplary embodiments.

The rigidity of the guide tube 2 at the abutment location 15 in all exemplary embodiments is lower than the rigidity of the guide tube 2 in a region that lies away from the abutment location 15 and away from the antivibration element 16.

The abutment location 15 is advantageously not located in the region of a telescopic installation. The overall length of the two sub-portions 13 and 14, said overall length in the exemplary embodiment corresponding to the overall length L of the guide tube 2, is advantageously invariable. The rigidity of the guide tube 2 abruptly decreases at the abutment location. In an advantageous design embodiment, one of the sub-portions 13, 14 engages across the other sub-portion 13, 14. Further advantageous embodiments result when the sub-portions 13 and 14 lie beside one another in an overlap-free manner.

The length of a sub-portion of the guide tube 2 is advantageously at least double the length, in particular at least four times the length, of the other sub-portion of the guide tube.

In the case of one further advantageous exemplary embodiment, the guide tube possesses a further abutment location 15 at which two rigid sub-portions of the guide tube are connected to one another, wherein the two sub-portions of the guide tube 2 are mutually displaceable in an axial manner in the direction of the longitudinal central axis 21. Accordingly, a telescopic installation is formed at the further abutment location.

The guide tube 2 at the abutment location 15 can be capable of being separated into the sub-portions 13 and 14, wherein a drive shaft and/or Bowden cables in particular run in an uninterrupted manner at the abutment location 15 or in the vicinity of the latter, respectively. An abutment location 15 is accordingly in particular not provided for separating the implement, for example so as to enable simple transportation or the like. The abutment location 15 is advantageously not visible to the operator.

The drive motor 9 in the exemplary embodiment shown in the figures is disposed in the housing 5 and is part of the first mass body 4. The drive motor 9 can however also be part of the second mass body 7. This is particularly advantageous when the drive motor 9 is an electric motor. The means 11 for power transmission which are guided through the guide tube 2, in this case advantageously comprise at least one line which supplies power to the electric motor. The electric line is advantageously not interrupted at the abutment location 15. The electric line extends in particular at least from the first end 3 up to the second end 6 of the guide tube 2, and is at most interrupted in the region of a telescopic installation so as to enable axial relative movements of portions of the guide tube 2 by way of the telescopic installation.

The following arrangements are particularly advantageous in terms of the construction of the implement:

The first mass body 4 comprises a drive motor 4, configured as an internal combustion engine, and a fuel tank; the second mass body 7 comprises the tool 8, as well as optionally a gearbox; and the means 11 for power transmission are formed by a drive shaft that is guided through the guide tube 2.

The first mass body 4 comprises an accumulator or a battery or a connector cable for the supply of power; the second mass body 7 comprises a drive motor 4, configured as an electric motor, the tool 8, as well as optionally a gearbox; and the means 11 for power transmission are formed by an electric line that is guided through the guide tube 2.

The first mass body 4 comprises a drive motor 4, configured as an electric motor, and an accumulator or a battery or a connector cable for the supply of power; the second mass body 7 comprises the tool 8, as well as optionally a gearbox; and the means 11 for power transmission are formed by a drive shaft that is guided through the guide tube 2.

Further advantageous exemplary embodiments are derived by combining individual or all features of the exemplary embodiments with one another.

While specific embodiments of the invention have been shown and described in detail to illustrate the inventive principles, it will be understood that the invention may be embodied otherwise without departing from such principles.

We claim:

1. A manually guided implement, comprising: a guide tube; a first mass body disposed on a first end of the guide tube; a second mass body disposed on a second end of the guide tube, wherein one of the mass bodies comprises at least one housing, and the other of the mass bodies comprises at least one tool; a drive motor to drive the tool; means for power transmission for driving the tool are guided in the interior of the guide tube between the first end and the second end; a first antivibration element disposed between the first end of the guide tube and the first mass body, wherein the guide tube, in a direction of a longitudinal central axis of the guide tube, has at least one first rigid sub-portion and one second rigid sub-portion, the two sub-portions being connected to one another at an abutment location; and at least one second antivibration element that connects the first sub-portion and the second sub-portion at the abutment location.

2. The implement according to claim 1, wherein the first and the second sub-portions possess an invariable overall length.

3. The implement according to claim 1, wherein the guide tube has an overall length, measured in the direction of the longitudinal central axis, that is larger than a length of each of the sub-portions, measured in the direction of the longitudinal central axis.

4. The implement according to claim 1, wherein the second antivibration element is at least in part composed of elastomer.

5. The implement according to claim 1, wherein the abutment location is disposed outside the two mass bodies.

6. The implement according to claim 1, wherein the first sub-portion engages over the second sub-portion in a region of the abutment location in the longitudinal direction of the guide tube.

7. The implement according to claim 6, wherein the second antivibration element, in terms of the longitudinal central axis of the guide tube, is disposed radially between the first sub-portion and the second sub-portion.

8. The implement according to claim 1, wherein mutually facing end sides of the first sub-portion and of the second sub-portion in the direction of the longitudinal central axis of the guide tube are disposed beside one another in an overlap-free manner.

9. The implement according to claim 8, wherein the second antivibration element in terms of the direction of the longitudinal central axis is disposed radially outside the first sub-portion and the second sub-portion, and the second antivibration element bears on at least one of the sub-portions.

10. The implement according to claim 8, wherein the second antivibration element in terms of the direction of the longitudinal central axis is disposed radially within the first sub-portion and the second sub-portion, and the second antivibration element bears on at least one of the sub-portions.

11. The implement according to claim 8, wherein the second antivibration element is disposed between the mutually facing end sides of the first sub-portion and the second sub-portion.

12. The implement according to claim 1, further comprising a fastening device that fixes the second antivibration element, wherein the fastening device has a lower rigidity than the guide tube away from the abutment location and the second antivibration element.

13. The implement according to claim 1, wherein the first sub-portion and the second sub-portion on an end side that faces the first mass body have identical external diameters.

14. The implement according to claim 1, wherein the first mass body comprises the housing, and the second mass body comprises the tool.

15. A manually guided implement, comprising: a guide tube; a first mass body disposed on a first end of the guide tube; a second mass body disposed on a second end of the guide tube, wherein one of the mass bodies comprises at least one housing, and the other of the mass bodies comprises at least one tool; a drive motor to drive the tool; means for power transmission for driving the tool are guided in the interior of the guide tube between the first end and the second end; a first antivibration element disposed between the first end of the guide tube and the first mass body, wherein the guide tube, in a direction of a longitudinal central axis of the guide tube, has at least one first rigid sub-portion and one second rigid sub-portion, wherein the first sub-portion is assigned to the first mass body and the second sub-portion is assigned to the second mass body, the two sub-portions being connected to one another at an abutment location; and at least one second antivibration element that connects the first sub-portion and the second sub-portion at the abutment location, wherein the second sub-portion has an end side that faces the first mass body, and the end side in relation to the first mass body has a spacing which is smaller than one third of a spacing between the first mass body and the second mass body.

16. The implement according to claim 15, wherein the end side in relation to the first mass body has a spacing which is smaller than one fifth of the spacing between the first mass body and the second mass body.

17. A manually guided implement, comprising: a guide tube; a first mass body disposed on a first end of the guide tube; a second mass body disposed on a second end of the guide tube, wherein one of the mass bodies comprises at least one housing, and the other of the mass bodies comprises at least one tool; a drive motor to drive the tool; means for power transmission for driving the tool are guided in the interior of the guide tube between the first end and the second end; a first antivibration element disposed between the first end of the guide tube and the first mass body, wherein the guide tube, in a direction of a longitudinal central axis of the guide tube, has at least one first rigid sub-portion and one second rigid sub-portion, the two sub-portions being connected to one another at an abutment location; and at least one second antivibration element that connects the first sub-portion and the second sub-portion at the abutment location, wherein the second antivibration element is connected in a rotationally fixed manner to the first sub-portion and in a rotationally fixed manner to the second sub-portion.

\* \* \* \* \*